United States Patent
Lee (10) Patent No.: US 9,477,769 B2
(45) Date of Patent: Oct. 25, 2016

(54) METHOD AND SYSTEM FOR DETECTING ORIGINAL DOCUMENT OF WEB DOCUMENT, METHOD AND SYSTEM FOR PROVIDING HISTORY INFORMATION OF WEB DOCUMENT FOR THE SAME

(75) Inventor: ChangHee Lee, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 1023 days.

(21) Appl. No.: 12/572,150

(22) Filed: Oct. 1, 2009

(65) Prior Publication Data

US 2010/0088589 A1    Apr. 8, 2010

(30) Foreign Application Priority Data

Oct. 2, 2008    (KR) .................. 10-2008-0097145

(51) Int. Cl.
    *G06F 17/00*    (2006.01)
    *G06F 17/30*    (2006.01)

(52) U.S. Cl.
    CPC ............... *G06F 17/30876* (2013.01)

(58) Field of Classification Search
    CPC ............................................. G06F 17/30876
    USPC .................................. 715/234, 229
    See application file for complete search history.

(56) References Cited

U.S. PATENT DOCUMENTS

| | | | | |
|---|---|---|---|---|
| 6,424,966 | B1 * | 7/2002 | Meyerzon et al. | 707/610 |
| 6,547,829 | B1 * | 4/2003 | Meyerzon et al. | 715/234 |
| 2002/0120648 | A1 * | 8/2002 | Ball et al. | 707/511 |
| 2004/0003352 | A1 * | 1/2004 | Bargeron | G06F 17/24 |
| | | | | 715/230 |
| 2004/0019499 | A1 * | 1/2004 | Murashita | 705/1 |
| 2005/0071741 | A1 * | 3/2005 | Acharya et al. | 715/500 |
| 2006/0064394 | A1 * | 3/2006 | Dettinger | G06F 17/30876 |
| 2006/0136511 | A1 * | 6/2006 | Ngo et al. | 707/203 |
| 2006/0248063 | A1 * | 11/2006 | Gordon | 707/3 |
| 2007/0094254 | A1 * | 4/2007 | Cutts et al. | 707/5 |
| 2008/0097972 | A1 * | 4/2008 | Gordon | 707/3 |
| 2009/0204595 | A1 * | 8/2009 | Dombrowski et al. | 707/5 |
| 2009/0216868 | A1 * | 8/2009 | Gao et al. | 709/223 |
| 2010/0023562 | A1 * | 1/2010 | Kreuch et al. | 707/203 |

FOREIGN PATENT DOCUMENTS

| | | |
|---|---|---|
| JP | 2001-503537 | 3/2001 |
| JP | 2003-316914 | 11/2003 |

(Continued)

OTHER PUBLICATIONS

Hidekazu Nishizawa, Takehisa Kato, Toshiaki Saisho, Authoring and Versioning management System, System Integration Technology Center, Information and Industrial Systems & Services Company, Toshiba Corporation, original-related guarantee system by the update traceability of the document, Computer Security Symposium 2000, Japan, Information Processing Society of Japan, Oct. 26, 2000, vol. 2000, No. 12, p. 31-36.

*Primary Examiner* — Mustafa Amin
(74) *Attorney, Agent, or Firm* — Greer Burns & Crain Ltd.

(57) ABSTRACT

A method for detecting an original document of a web document, which is able to thwart manipulation of generation time of the web document. The method for detecting an original document of a web document comprises receiving history information on the generation or modification of web documents; filtering the web documents using the history information; and detecting an original document of the filtered web documents based on the history information.

13 Claims, 5 Drawing Sheets

(56) References Cited

FOREIGN PATENT DOCUMENTS

| | | |
|---|---|---|
| JP | 2006-227965 | 8/2006 |
| JP | 2007-207202 | 8/2007 |
| JP | 2008-176640 | 7/2008 |
| JP | 2008-181350 | 8/2008 |
| JP | 2008-537264 | 9/2008 |
| KR | 10-20010064736 | 11/2001 |
| KR | 10-20040078896 | 9/2004 |
| KR | 10-20040011769 | 11/2004 |

* cited by examiner

METHOD AND SYSTEM FOR DETECTING ORIGINAL DOCUMENT OF WEB DOCUMENT, METHOD AND SYSTEM FOR PROVIDING HISTORY INFORMATION OF WEB DOCUMENT FOR THE SAME

CROSS-REFERENCE TO RELATED APPLICATION

This application claims priority from and the benefit of Korean Patent Application No. 10-2008-0097145, filed on Oct. 2, 2008, which is hereby incorporated by reference for all purposes as if fully set forth herein.

BACKGROUND OF THE INVENTION

1. Field of the Invention

Exemplary embodiments of the present invention relate to a method for detecting an original document of a web document, and more particularly, to a method for detecting an original document from several copied on-line documents.

2. Discussion of the Background

Various services using the Internet are provided with the development and propagation of the Internet, and a search service is a representative example of these services. The search service refers to a service in which, when a user inputs a word or combination of words to be searched as a query, search result documents corresponding to the query inputted to a search engine are provided to the user. Such search result documents are classified into categories such as Dictionary, Information, Blog, Cafe, Specialized Data, Cite, Book, Webpage, Moving Picture, and the like, and the classified categories are provided to users.

Recently, there has been an increase in search result documents, which are obtained by copying documents made by other users or posting the copied documents on users own blog or cafe as opposed to originally creating documents with respect to a specific theme. This is because documents used on the Internet can be easily copied. As a result, a user makes a document by identically reproducing an original document from a newspaper article or specialized data or another user's blog or cafe or by selectively copying a desired part of the original document. Such a copied document is identical to the original document or is substantially identical to the same document. Therefore, a plurality of copied documents that are identical or substantially identical to the original document may exist in the search result documents. In this case, when the search ranking of the copied documents are ranked above that of the original document instead of ranked below that of the original document, the exact search results are not provided to users.

To solve such a problem, there exist several methods for determining an original document from the original document and copied documents. However, since the copied documents are identical or substantially identical to the original document, in practice it is difficult to determine the original document. In addition, a document having the earliest distributed time of a web document is generally determined as an original document. However, when the distributed time is manipulated, it is more difficult to determine the original document.

SUMMARY OF THE INVENTION

Exemplary embodiments of the present invention provide a method and system for detecting an original document of a web document, which can detect an original document of a web document by using history information of the web document.

Exemplary embodiments of the present invention also provide a method and system for providing history information of a web document, which can provide history information of a web document necessary for detecting an original document of the web document.

Additional features of the invention will be set forth in the description which follows, and in part will be apparent from the description, or may be learned by practice of the invention.

An exemplary embodiment of the present invention discloses a method of detecting an original document of a web document comprising receiving history information on the generation or modification of web documents; filtering the web documents by implementing the history information; and detecting an original document of the filtered web documents based on the history information.

An exemplary embodiment of the present invention also discloses a method of providing history information of a web document comprising receiving a ping upon the generation or modification of web documents; generating history information on the generation or modification of the web documents implementing time information when the ping is received; and providing the generated history information of the web documents to a system for detecting an original document of a web document.

An exemplary embodiment of the present invention also discloses one or more storage media having stored thereon a computer program that, when executed by one or more processors, causes the one or more processors to perform acts comprising receiving history information on the generation or modification of web documents; filtering the web documents implementing the history information; and detecting an original document of the filtered web documents based on the history information.

An exemplary embodiment of the present invention also discloses a system of detecting an original document of a web document comprising a history information receiving component to receive history information on the generation or modification of web documents; a collecting component to crawl web documents corresponding to the history information and filter the crawled web documents implementing the history information; and a detecting component to group the filtered documents for each similar document and detect an original document of the grouped similar documents based on the history information.

An exemplary embodiment of the present invention also discloses a system of providing history information of a web document comprising a ping receiving component to receive a ping upon the generation or modification of web documents; a history information generating component to generate history information on the generation or modification of the web documents implementing time information when the ping is received; and a history information providing component to provide the generated history information of the web documents to a system for detecting an original document of a web document.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1:
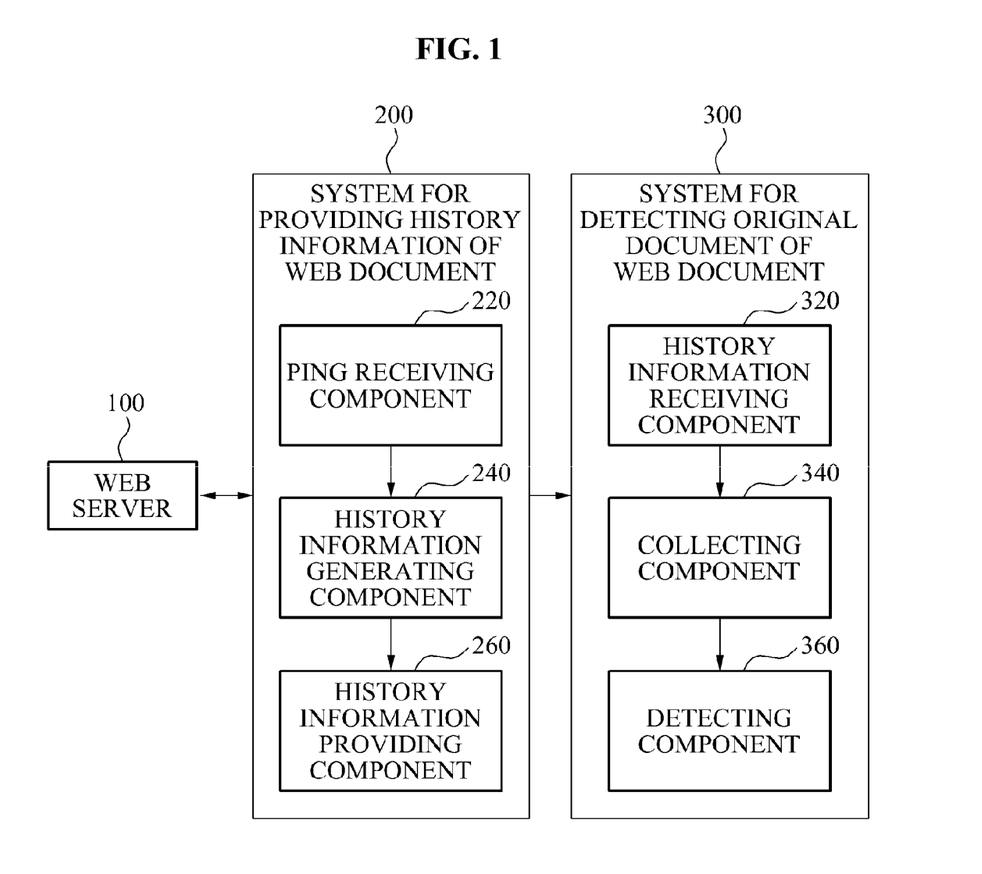
FIG. 1 is a block diagram illustrating a system for providing history information of a web document and a system for detecting an original document of a web document according to an exemplary embodiment of the present invention.

FIG. 1 is a block diagram illustrating a system 200 for providing history information of a web document and a system 300 for detecting an original document of a web document according to an exemplary embodiment of the present invention.

As illustrated in FIG. 1, the system for providing the history information of the web document 200 is connected to a web server 100 through a communication network, and includes a ping receiving component 220, a history information generating component 240, and a history information providing component 260. The system for detecting the original document of the web document 300 receives history information of a web document provided from the system for providing the history information of the web document 200, and includes a history information receiving component 320, a collecting component 340, and a detecting component 360.

Also, the system for detecting the original document of the web document 300 may be included in a search system (not illustrated) or metablog server (not illustrated), or may be configured separately from the search system or metablog server. The system for detecting the original document of the web document 300 may be included or may be configured separately so that, for example, an original document detected by the system for detecting the original document of the web document 300 is reflected in search rankings when a search service is provided in the search system. Alternatively, the system for detecting the original document of the web document 300 may be included in the web server 100 so that the web server 100 may independently detect an original document.

Here, the web server 100 is illustrated for convenience of description. However, the web server 100 may comprise of various kinds of web servers such as a cafe server, a blog server, and a portal server, in which web documents are stored. For convenience of description, the web server 100 as a blog sever will be described hereinbelow.

Also, the system for providing the history information of the web document 200 generates history information through a pingback protocol with the web server 100. Here, an example of the pingback protocol will be described with reference to FIG. 2.

Figure 2:
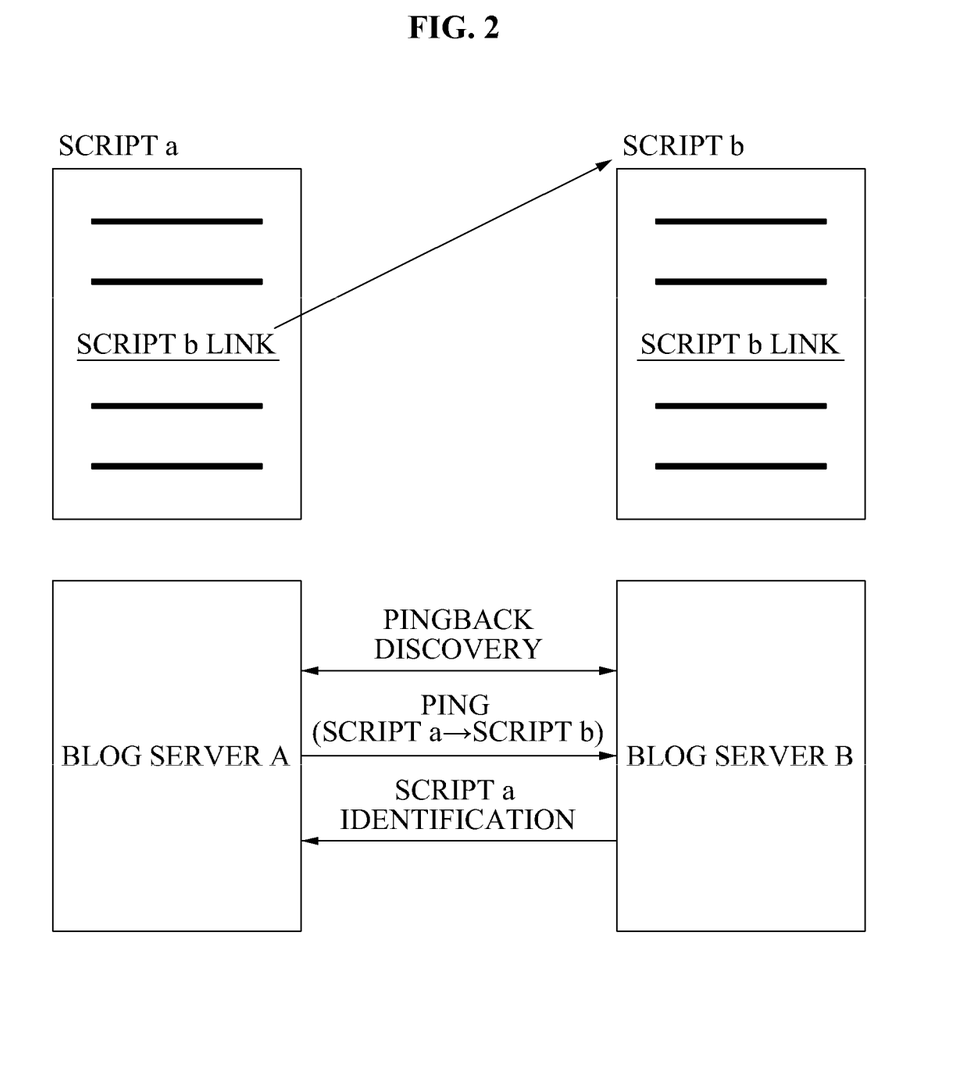
FIG. 2 illustrates an example of a pingback protocol.

FIG. 2 illustrates an example of a pingback protocol.

The pingback protocol refers to a protocol through which, when script "b" is cited in script "a" as a link, blog server "A" having the script "a" stored therein automatically informs blog server "B" having the script "b" stored therein that the script "b" is cited in script "a", using a ping.

That is, the ping refers to a signal through which, when a useful script is cited in text as a link, a fact that the useful script is cited in text as a link is automatically reported to a sever in which a document having the script cited therein is stored. Thus, in the present invention, when a cited web document is generated or modified, the web server 100 automatically provides information on the generation or modification of the web document to the system for providing the history information of the web document 200 using the ping.

The system for providing the history information of the web document 200 may be a ping server according to an exemplary embodiment of the present invention. Here, an example of the ping server will be described with reference to FIG. 3.

Figure 3:
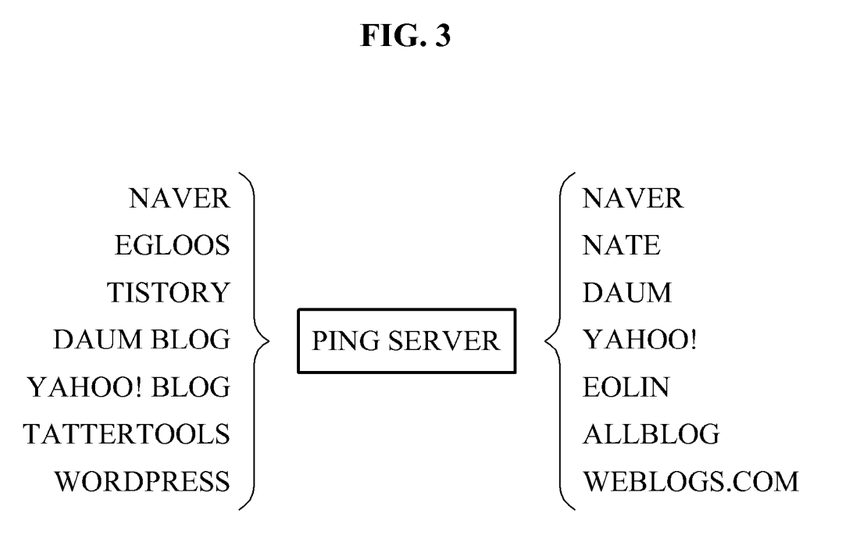
FIG. 3 illustrates an example of a ping sever.

FIG. 3 illustrates an example of a ping sever.

The ping server receives a ping upon generation or modification of several web documents in a blog from several blog servers such as NAVER, EGLOOS, and TISTORY, and the like, and provides history information on the generation or modification of the web documents to search systems such as NAVER, NATE, DAUM, and the like, or metablog servers such as EOLIN, ALLBLOG, and the like.

Hereinafter, the system for providing the history information of the web document 200 will be described with reference to FIG. 1.

The ping receiving component 220 receives a ping upon generation or modification of web documents. Here, the ping is received when the web documents are generated or modified. That is, as described above, history information is generated through the pingback protocol with the web server 100. Accordingly, the system for providing the history information of the web document 200 receives a ping from the web server 100.

The history information generating component 240 generates history information on the generation or modification of web documents using information of a time when the ping receiving component 220 receives a ping. That is, the time when the ping receiving component 220 receives the ping signifies a time when the web documents are generated or modified. Therefore, the history information generating component 240 generates history information on the time when the web documents are generated or modified.

Here, the history information may be generated for a uniform resource locator (URL) of each of the web documents. For example, when assuming that several documents are generated or modified in a blog, history information on the generation or modification of web documents may be generated for each URL corresponding to each web document in the blog.

The history information generating component 240 collects at least one of information on the title and text of a web document corresponding to the received ping so that the at least one of information on the title and text of the web document can be included in the history information, according to an exemplary embodiment of the present invention. For example, in practice, the history information generating component 240 visits a blog corresponding to the received ping so as to collect and store a portion of the title and text of a web document when the web document is generated or modified.

The visiting of the blog is because a blog editor may manipulate the ping without generating or modifying the web document. Accordingly, the history information generating component 240 checks whether the web document is actually generated or modified.

The history information providing component 260 provides history information on web documents to the system for detecting the original document of the web document 300. That is, the history information providing component 260 provides history information on various web documents, that is, the generation and modification of various scripts in a blog to the system for detecting the original document of the web document 300.

Hereinafter, the system for detecting the original document of the web document 300 will be described.

The history information receiving component 320 receives history information on the generation or modification of web documents. That is, the history information receiving component 320 receives history information on the generation or modification of web documents generated by the system for providing the history information of the web document 200.

The history information may be generated by the pingback protocol when the web documents are generated or modified according to an exemplary embodiment of the present invention. As described above, the history information may be generated by a ping through the pingback protocol between the web server 100 and the system for providing the history information of the web document 200.

The history information may be generated for a URL of each web document according to an exemplary embodiment of the present invention. That is, the history information on the generation or modification of web documents is managed for the URL of each of the web documents.

The history information may include time information when the web documents are generated or modified, according to an exemplary embodiment of the present invention. The time information may be included since the history information is generated using time information when the ping is received as described above.

The history information may include at least one of information on the title and text when the web documents are generated or modified, according to an exemplary embodiment of the present invention.

The collecting component 340 crawls web documents corresponding to history information and filters the crawled web documents using the history information. That is, the collecting component 340 may collect only the web documents corresponding to the history information received from the system for providing the history information of the web document 200 and filters the crawled web documents using the history information, the collecting component 340 may not crawl all the web documents.

When web documents are generated or modified, the collecting component 340 may determine whether a web document is actually modified when the web documents are crawled, according to an exemplary embodiment of the present invention. Specifically, the collecting component 340 may determine whether at least one of information on the title and text of the crawled web documents corresponding to the received history information corresponds to at least one of the information on the title and text of the web document when the web documents are generated or modified.

That is, the collecting component 340 determines that a web document is modified when the crawled web documents are generated or modified. When the web document is modified, it is excluded from the crawled web documents. This is because the web document is generated or modified and then may be replaced with another document.

The detecting component 360 groups the filtered web documents for each similar document and detects an original document of the similar documents grouped based on the history information.

The grouped similar documents may be grouped using chunks of the crawled web documents according to an exemplary embodiment of the present invention. Here, the chunk refers to each mass when the text of a web document is divided into at least one mass. Since such chunks may coexist in original and copied documents, the detecting component 360 can group the original and copied documents using the chunks. The detecting component 360 is not limited to the method using chunks but may group similar documents using a time stamp or other methods.

The detecting component 360 may detect as an original document a web document having the earliest generation or modification time of a document among the grouped similar documents according to an exemplary embodiment of the present invention. That is, since information on the generation or modification of a corresponding document is included in history information of the document among the grouped similar documents, the detecting component 360 detects as an original document a web document having the earliest generation or modification time of a document included in the history information among the grouped similar documents.

Preferably, the detecting component 360 detects as an original document a web document having the earliest generation or modification time of a document with similar content to the corresponding document in the generation or modification time of the document included in the history information on each of the grouped similar documents.

Hereinafter, a method for providing history information of a web document according to an exemplary embodiment of the invention will be described with reference to FIG. 4.

Figure 4:
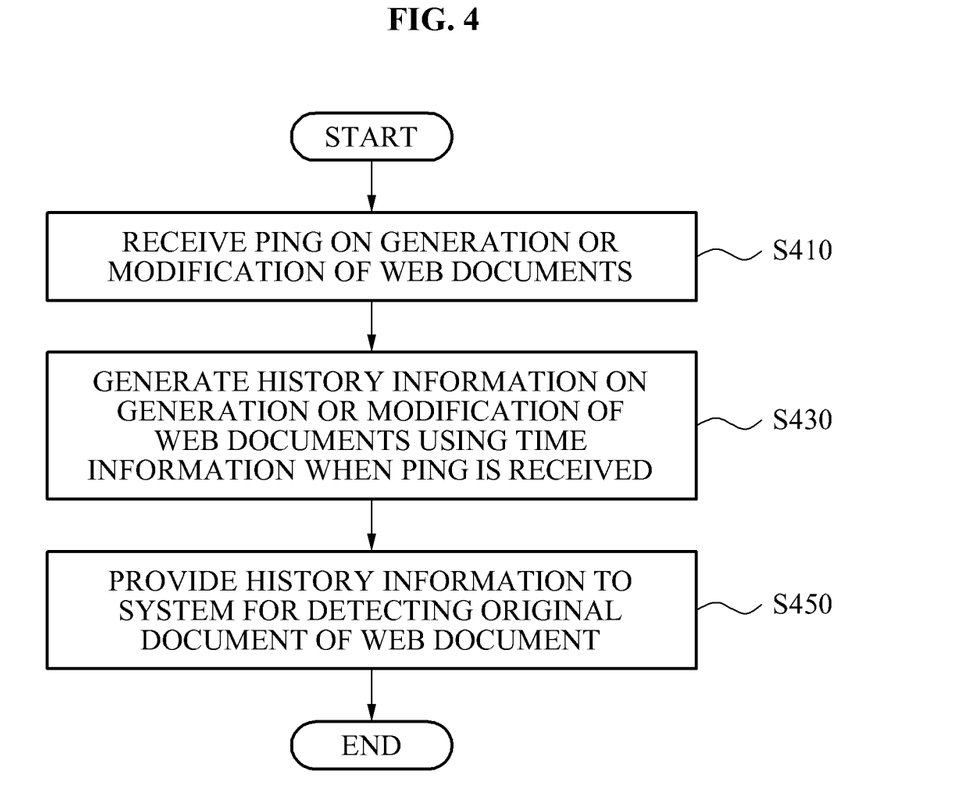
FIG. 4 is a flowchart illustrating a method for providing history information of a web document according to an exemplary embodiment of the present invention.

FIG. 4 is a flowchart illustrating a method for providing history information of a web document according to an exemplary embodiment of the invention.

In operation S410, a ping upon generation or modification of web documents is received. Here, the ping refers to a signal through which, when a useful script is cited in text as a link, a fact that the useful script is cited in text as a link is automatically informed to a sever in which a document having the script cited therein is stored.

The ping is received when the web documents are generated or modified, according to an exemplary embodiment of the present invention. Thus, time information on the generation or modification of the web documents can be obtained using the ping.

In operation S430, history information on the generation or modification of the web documents is generated using the time information of when the ping is received.

Here, the method according to an exemplary embodiment of the present invention may further include the operation of collecting at least one of information on the title and text of a web document corresponding to the ping. The history information may include at least one of the information on the title and the text of the web document.

The history information may be included since a web document editor may manipulate the ping without generating or modifying web documents. Accordingly, whether the web documents are actually generated or modified is checked.

The history information may be generated for a URL of each of the web documents according to an exemplary embodiment of the present invention. For example, when assuming that several documents are generated or modified in a blog, history information on the generation or modification of web documents may be generated for the URL corresponding to each of the documents in the blog.

In operation S450, the history information on the generated web documents is provided to a system for detecting an original document of a web document.

Accordingly, the method according to an exemplary embodiment of the present invention can detect an original document using history information of a web document provided from the system. Hereinafter, a method for detecting an original document of a web document according to an exemplary embodiment of the invention will be described with reference to FIG. 5.

Figure 5:
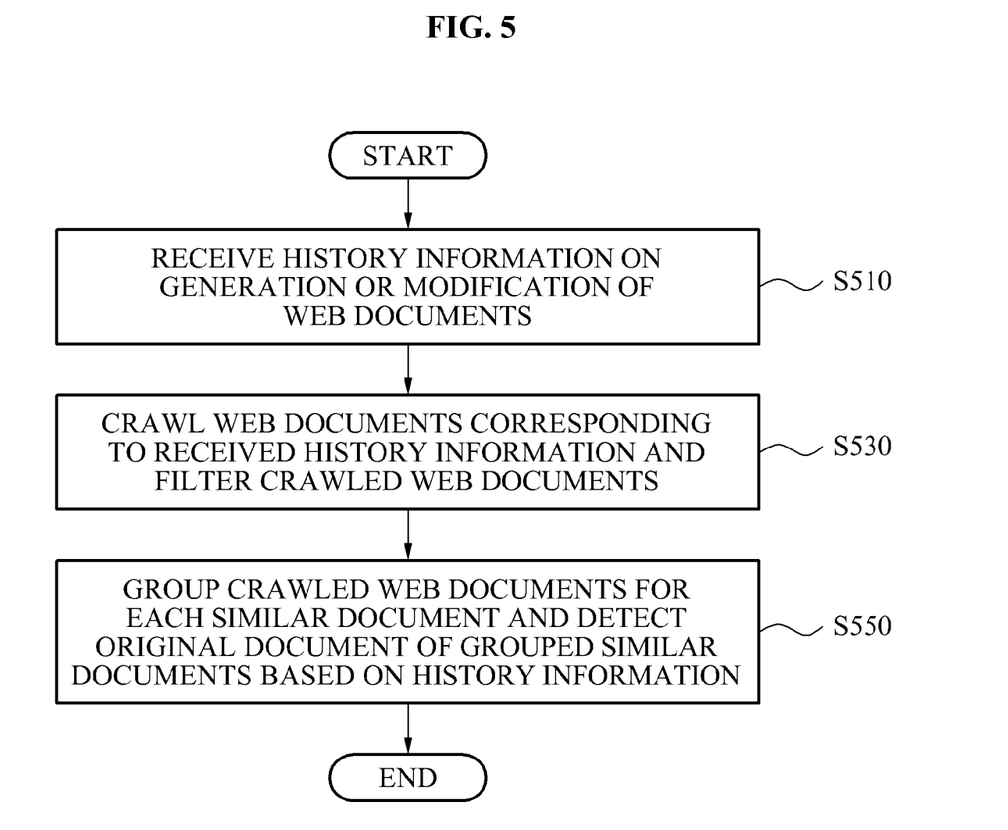
FIG. 5 is a flowchart illustrating a method for detecting an original document of a web document according to an exemplary embodiment of the present invention.

FIG. 5 is a flowchart illustrating a method for detecting an original document of a web document according to an exemplary embodiment of the invention.

In operation S510, history information on the generation or modification of web documents is received. The history information may be generated by the pingback protocol when the web documents are generated or modified, according to an exemplary embodiment of the present invention.

The history information may include time information when the web documents are generated or modified, according to an exemplary embodiment of the present invention. The time information may be included since the history information is generated using the ping when the web documents are generated or modified.

The history information may include at least one of information of the title and text when the web documents are generated or modified.

In operation S530, web documents corresponding to the received history information are crawled, and the crawled web documents are filtered using the history information.

Here, when web documents are generated or modified, it may be determined whether the web documents are actually modified when the web documents are crawled, thereby filtering the crawled web documents. Specifically, it is determined whether at least one of information on the title and text of at least one crawled web document corresponds to the information on the title and text of the web document when the web documents are generated or modified, thereby filtering the crawled web documents. That is, when a web document, when the web documents are generated or modified, is modified at its crawled time, it is excluded from the crawled web documents. This is for the purpose of preventing a corresponding web document from being changed to manipulate search rankings of web documents after the web documents are generated or modified.

In operation S550, the filtered web documents are grouped for each similar document, and an original document of the grouped similar documents is detected based on the history information. In the method according to an exemplary embodiment of the present invention, a web document having the earliest generation or modification time of a document among the grouped similar documents may be detected as an original document.

Here, the grouped similar documents may be grouped using chunks of the crawled web documents. The present invention is not limited to the method using chunks but may group similar documents using a time stamp or other methods.

Preferably, a web document having the earliest generation or modification time of a document with similar content to the corresponding document in the generation or modification time of the document included in the history information of each of the grouped similar documents is detected as an original document.

Thus, the method according to the embodiment of the present invention uses history information generated when web documents are generated or modified, so that an original document can be exactly detected even when the generation or modification time of the web documents are manipulated. Accordingly, exact ranking information can be provided in a search service.

The method for detecting the original document of the web document according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of detecting an original document from a plurality of web documents using a processor, the method comprising:

receiving notification upon generation or modification of the web documents from a web server, the generation or modification of the web documents being detected by the web server when the web documents are cited as links in at least one web document in the web server;

generating history information for a uniform resource locator (URL) of each of the web documents that are generated or modified, at a time the notification is received;

crawling the web documents corresponding to the generated history information to determine whether the crawled web documents have been further modified since the time of receipt of the notification of generation or modification of the web documents;

filtering, by the processor, the crawled web documents by excluding each of the crawled web documents that are determined to be further modified since the time of receipt of the notification; and detecting an original document of the crawled web documents that are filtered based on the history information;

wherein the time of receipt of the notification also indicates a time the web documents are generated or modified; and a web document from the filtered web documents having an earliest generated or modified time is determined to be the original document.

2. The method of claim 1, wherein the notification is generated by a pingback protocol when the web documents are generated or modified.

3. The method of claim 1, wherein the history information comprises information on at least one of a title and text of each of the web documents when the web documents are generated or modified.

4. The method of claim 1, further comprising:

determining whether the history information on at least one of a title and text of each of the crawled web documents corresponds to at least one of the information on the titles and text of the web documents at the time when the web documents are generated or modified.

5. The method of claim 1, further comprising:

grouping the filtered web documents by chunks of the crawled web documents before detecting the original document.

6. The method of claim 1, wherein the detecting an original document is performed by determining the filtered web document having the earliest generation or modification time of a document among a group of documents obtained by grouping the filtered web documents by chunks of the crawled web documents.

7. A non-transitory computer-readable storage medium having stored thereon a computer program for detecting an original document from a plurality of web documents, the computer program, when executed by one or more processors, causing the one or more processors to perform acts comprising:

receiving notification upon generation or modification of the web documents from a web server, the generation or modification of the web documents being detected by the web server when the web documents are cited as links in at least one web document in the web server;

generating history information for a uniform resource locator (URL) of each of the web documents that are generated or modified at a time the notification is received;

crawling the web documents corresponding to the generated history information to determine whether the crawled web documents have been further modified since the time of receipt of the notification of generation or modification of the web documents;

filtering, by the processor, the crawled web documents by excluding each of the crawled web documents that are determined to be further modified since the time of receipt of the notification; and detecting an original document of the crawled web documents that are filtered based on the history information;

wherein the time of receipt of the notification also indicates a time the filtered web documents are generated or modified; and wherein a web document from the filtered web documents having an earliest generated or modified time is determined to be the original document.

8. A system of detecting an original document from a plurality of web documents, comprising:

a processor in communication with a computer network and executing a plurality of processing components;

the processing components including, a history information receiving component executed to receive history information for a uniform resource locator (URL) of each of web documents that are generated or modified in a web server at a time a notification is issued upon generation or modification of the web documents, the generation or modification of the web documents being detected by the web server when the web documents are cited as links in at least one web document in the web server;

a collecting component executed to crawl the web documents corresponding to the received history information to determine whether the crawled web documents have been further modified since the time of receipt of the notification of generation or modification of the web documents, and to filter the crawled web documents by excluding each of the crawled web documents that are determined to be further modified since the time of receipt of the notification; and a detecting component executed to group the crawled web documents that are filtered by chunks of the crawled web documents, and detect an original document of the grouped documents based on the history information.

9. The system of claim 8, wherein the notification is generated by a pingback protocol when the web documents are generated or modified.

10. The system of claim 8, wherein the history information comprises time information on when the web documents are currently generated or modified.

11. The system of claim 8, wherein the history information comprises information on at least one of a title and text of each of the web documents, when the web documents are generated or modified.

12. The system of claim 8, wherein the collecting component is executed to determine whether at least one of information on a title and text of the crawled web documents corresponds to the information on at least one of a title and text of each of the web documents, at a time the web documents are generated or modified.

13. The system of claim 8, wherein the detecting component is executed to detect as the original document a web document having an earliest generation or modification time among the grouped documents.

* * * * *